Aug. 14, 1928.  1,680,736
F. HODGKINSON ET AL
TURBINE VALVE MECHANISM
Filed Nov. 11, 1924
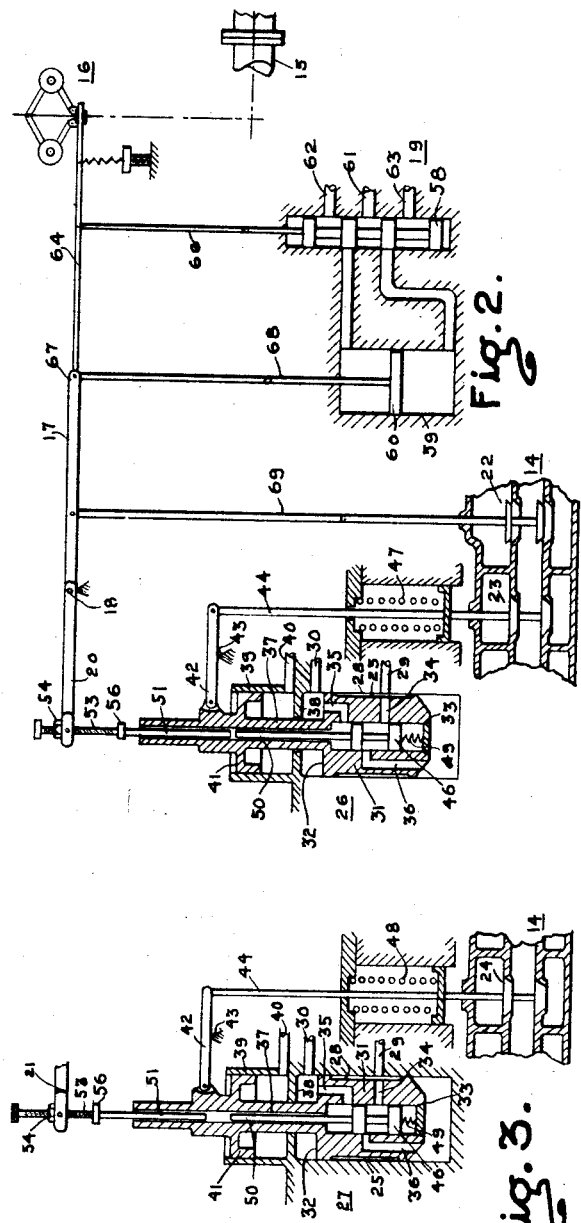
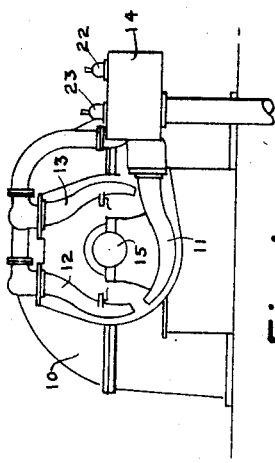
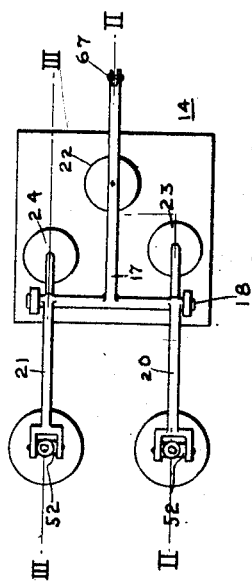
WITNESSES:
F. Hodgkinson &
R.C. Allen.
INVENTOR
BY
ATTORNEY Patented Aug. 14, 1928.

1,680,736

UNITED STATES PATENT OFFICE.

FRANCIS HODGKINSON AND ROBERT C. ALLEN, OF SWARTHMORE, PENNSYLVANIA, ASSIGNORS TO WESTINGHOUSE ELECTRIC & MANUFACTURING COMPANY, A CORPORATION OF PENNSYLVANIA.

TURBINE VALVE MECHANISM.

Application filed November 11, 1924. Serial No. 749,266.

Our invention relates to an operating mechanism for the admission valves of elastic fluid motors and it has for an object to provide apparatus of the character designated which shall be effective to open the valves in a predetermined sequence and close them in the inverse sequence, employing positive force so that the sticking of valves in either an open or a closed position is prevented.

Another object of our invention is to provide an operating mechanism for the admission valves of elastic fluid motors wherein the valves are closed and held on their seats by a relatively heavy force and may be opened by a relatively small force.

Another object is to provide a control mechanism wherein the admission valves are automatically closed when the speed of the motor has increased above a predetermined point.

A further object is to provide a fluid motor in connection with a valve-controlled mechanism, with an operating piston which, when acted upon by fluid under pressure moves and exerts a relatively heavy force, which force is readily released and the piston moved in the opposite direction by a relatively small force.

These and other objects are obtained by apparatus illustrated in the accompanying drawings, of which Fig. 1 is an end view in elevation of a turbine having a steam chest and three nozzle blocks; Fig. 2 is a diagrammatic view showing the application of our improved apparatus to such a turbine as is illustrated in Fig. 1 and showing in section the means for operating the primary and secondary valves along the section line II—II in Fig. 4; Fig. 3 is a sectional view of the servomotor for operating the tertiary valve and taken along the line III—III of Fig. 4; and Fig. 4 is a plan view of a steam chest having primary, secondary and tertiary admission valves and showing a part of our improved control mechanism applied thereto.

In the operation of elastic-fluid motors, more especially of turbines, it is common to employ a plurality of nozzle blocks with a corresponding number of admission valves, each nozzle block having a separate valve for admitting steam to it from a steam chest. It is customary in the operation of such apparatus to open and close the valves in accordance with varying load demands. This is done either manually or by a suitable control mechanism. Where control mechanism is employed it has been proposed, in order to prevent sticking of the valves in an open position, and thus creating a danger of the motors overspeeding, to provide springs which normally bias the valve toward a closed position. The use of springs alone is open to the objection that, where springs of sufficient strength are employed to positively close the valve, an undue amount of power is required to open them. On the other hand where springs of insufficient strength to positively close the valve are employed, the danger of sticking in an open position still remains.

In accordance with the present invention, we employ the conventional speed-responsive governor with a fluid relay for opening all of the admission valves and for closing the primary valve, and while we provide springs for normally biasing the secondary and tertiary valves in a closing direction, we provide a separate servo-motor for closing each of the valves other than the primary valve, the servo-motors being effective to positively close the valves which they operate and to hold them on their seats with a relatively heavy force, which force is readily released and the valves moved to an open position by a relatively small force.

Referring now to the drawings for a more detailed understanding of our invention, we show in Fig. 1 a turbine casing 10 carrying three nozzle blocks 11, 12 and 13. At 14, is shown a steam chest supplying steam to the nozzle blocks. At 15, we show a turbine shaft which is connected in any suitable manner to a speed-responsive governor 16, Fig. 2. The speed-responsive governor 16 actuates a fluid relay mechanism 19 to be described later, and through said relay mechanism controls the turbine valves through a lever 17 fulcrumed at 18. The lever 17 has two arms 20, 21, beyond the fulcrum point 18, the lever arm 21 being shown broken away and shown in Fig. 3. The steam chest 14 has a primary admission valve 22 and secondary and tertiary valves 23 and 24 which supply steam to the nozzle blocks 11, 12 and 13. All of these valves are moved in an opening direction by the lever 17 and the lever arms 20 and 21 in a manner to be more fully described later. The secondary and tertiary valves 23 and 24 are normally biased toward a closing position by springs of moderate strength 47 and 48.

The lever 17 also serves to move the primary valve 22 in a closing direction. For moving the secondary and tertiary valves 23 and 24 in a closing direction, we employ, besides the springs 47 and 48, separate servo-motors 26 and 27.

Each of the servo-motors comprises a cylinder 28 having an inlet 29 for fluid under pressure and an outlet 30 for the exhaust of fluid. A hollow operating piston 31 is disposed within the cylinder 28 and has a face 32 which is at all times in communication with the exhaust outlet 30 and a face 33 which may be acted upon by fluid under pressure. Within the piston 31 is a passage 34 communicating with a reduced portion 25 of the piston and with the inlet 29 for fluid under pressure. The reduced portion 25 of the piston 31 insures this communication in whatever position the piston may assume. A passage 35 connects the hollow portion of the piston with the inactive face 32 and a passage 36 connects the hollow portion of the piston with the active face 33. The piston 31 has a stem portion 37 extending upwardly through a head portion 38 of the cylinder 28 and cooperates therewith so as to be approximately fluid tight. Any leakage of fluid past the head portion 38 is carried away by a drain 40.

The cylinder 28 has an extended portion 39 which cooperates with a centering piece 41 on the piston stem 37 so as to form guide means therefor. Connected to the piston stem 37 near its upper end is a lever 42 which is fulcrumed at 43 and which is connected through a link 44 to either the secondary or tertiary valve 23 or 24 as the case may be. Within the hollow piston 31 is a pilot valve 46 for connecting the fluid under pressure with the active face 33 of the piston 31 and for connecting the active face 33 with the inactive face 32 and thence out through the exhaust outlet 30.

The pilot valve 46 is normally biased upwardly by a spring 49 and in this position fluid under pressure passes from the inlet 29 through the passage 34, the pilot valve and passage 36 to the active face 33 of the piston 31. Under these circumstances the piston 31 is forced upwardly by the fluid under pressure. Through the linkage shown this force is communicated to the valve 23 or 24, as the case may be, closing it and firmly holding it upon its seat. The stem portion 37 of the piston 31 is hollowed out to accommodate a stem 50 of the pilot valve 46 and a valve rod 51 which is actuated by the arm 20 or 21, as the case may be, of the lever 17. The valve rod 51, when moved downwardly engages with the pilot valve stem 50 forcing it downwardly. Upon upward movement of the valve rod 51 it disengages from the valve stem 50 allowing the spring 49 to move the pilot valve upwardly.

The valve rod 51 is connected through a hinged block 52 to the arm 20 or 21 of the lever 17. A threaded portion 53 of the valve rod 51 passes through the hinged block 52 and serves to adjust the time of the engagement of the valve rod 51 with the valve stem 50 in relation to the movement of the lever arm 20 or 21. A lock nut 54 secures it in position after adjustment. An adjustable stop 56 on the valve rod 51, upon completion of the downward movement of the valve rod 51 engages with the upper end of the stem portion 37 of the piston 31 to move the piston downwardly and through the linkage shown open the secondary or tertiary valve 23 or 24 against the force exerted by the spring 47 or 48. As shown in the drawings, with the primary valve 22 only partly open and the secondary and tertiary valves 23 and 24 held tightly on their seats by fluid under pressure acting on the faces 33 of the pistons 31, the valve rods 51 are not in engagement with the stems 50 of the pilot valves 46. As the lever 17 moves upwardly opening the primary valve 22 wider, the arms 20 and 21 move downwardly carrying with them the valve rods 51 and, upon sufficient movement, they engage with the stems 50 of the pilot valves 46 forcing them downwardly against the action of the springs 49 and in this position connect the active faces 33 and inactive faces 32 of the pistons 31 through the passages 36 and 35 and the pilot valve 46 in the desired sequence.

The movement of the valve 46 just described blanks the passage 34 leading to the fluid pressure inlet and fluid beneath the piston 31 may now pass to the exhaust in the manner described and out through the exhaust outlet 30. The levers 20 and 21 continuing in their downward movement, the shoulders 56 of the valve rods 51 engage with the stem portions 37 of the piston 31, forcing them downwardly, and opening the secondary and tertiary valves 23 and 24 in a manner already described. The valve rods 51 which serve to move the pilot valves 46 may be so adjusted as to move the pilot valves 46 downwardly at any time with relation to the opening of the primary valve 22. In this manner the sequence in which the primary, secondary and tertiary valves are opened may be established. As will be noted from the drawings, the valve rod 51 of the servo-motor 27 is so adjusted that it moves the valve 46 of the servo-motor 27 downwardly after that of the servo-motor 26 has moved downwardly. With the valve rods 51 so adjusted, upon upward movement of the arms 20 and 21, the valve rod 51 of the servo-motor 27 is the first to dis-engage from the stem 50 of the valve 46, consequently, the tertiary valve 24 is the first to close.

The fluid relay mechanism 19 is of the conventional design and has a pilot valve 58, a cylinder 59 and an operating piston 60. The operating piston 60 has a stem 68 which is connected at 67 to the lever 17, already described. Fluid under pressure enters the pilot valve casing at 61 and is exhausted therefrom at 62 and 63. Upward movement of the pilot valve 58 serves to admit fluid under pressure above the piston 60 and exhaust the fluid from beneath it so as to force it downwardly. Downward movement of the pilot valve 58 serves to admit fluid under pressure beneath the piston 60 and to exhaust fluid from above it, thus forcing it upwardly. The speed-responsive device 16 is connected to a floating lever 64 from which depends a link 66 to the pilot valve 58.

The floating lever 64 is connected at 67 to the lever 17 and to the stem 68 of the piston 60. In operation, when the lever 64 is actuated by the speed-responsive device 16, for example, in a downward direction, and the pilot valve 58 is moved so as to admit fluid under pressure beneath the piston 60 forcing it upwardly, the stem 68 of the piston 60 being connected to the other end of the floating lever 64, at 67, as the piston moves upwardly, it carries the pilot valve upwardly so as to bring the pilot valve 58 to a lap position, preventing further movement of the piston 60 until a new position of the speed-responsive device 16 is assumed. The operating piston 60 of the relay device 19 serves to open and close the primary valve 22 through the lever 17 and a link 69 as shown.

From the foregoing description the operation of apparatus made in accordance with our invention is apparent. Assume that the turbine, as illustrated, is running under light load with the primary valve 22 partly open and the secondary and tertiary valves 23 and 24 tightly closed and held upon their seats, and that an increase in load causes a decrease in the speed of the turbine. As the speed decreases the speed-responsive device 16 causes the floating lever 64 to move downwardly carrying with it the pilot valve 58 of the relay mechanism 19. In this position, fluid under pressure is admitted beneath the piston 60 forcing it upwardly and carrying with it the lever 17, opening wider the primary valve 22. As the lever 17 moves upwardly the arms 20 and 21 move downwardly carrying with them the valve rods 51 of the servo-motors 26 and 27. The valve rod 51 of the servo-motor 26, being so adjusted, first engages with the stem 50 of the pilot valve 46 and moves the pilot valve downwardly.

In this position, fluid under pressure is cut off from the active face 33 of the piston 31 and the fluid beneath the piston allowed to exhaust in a manner already described. The operating piston 31 may now be moved downwardly by exerting a relatively small force sufficient to overcome the force exerted by the spring 47 on the valve 23. As the arm 20 continues its downward movement the stop 56 engages with the upper end of the stem portion 37 of the piston 31 and, with the pressure relieved beneath the piston, overcomes the force exerted by the spring 47 and opens the secondary valve 23 in a manner already described. With a continued increase in load and with a consequent further movement of the piston 60 of the relay mechanism 19 the lever 17 moves further upwardly, and the arm 21 moves further downwardly carrying with it the valve rod 51 of the servo-motor 27. This moves the pilot valve 46 of the servo-motor 27 downwardly relieving the pressure beneath the operating piston, allowing the stop 56 to engage with the stem 37 of the operating piston opening the tertiary valve 24. It will be observed that by adjusting the valve rods 51 the sequence with which the primary, secondary and tertiary valves are opened is established. It is also apparent that our improved mechanism could be applied to an elastic fluid motor having any number of admission valves and be so arranged as to open and close the valves in sequence and that it is not limited to the three valves shown in the drawing.

Assuming now a decrease in the load on the turbine with a consequent increase in speed, the speed-responsive device 16, through the relay mechanism 19, causes the operating piston 60 to move downwardly carrying with it the lever 17 and moving the primary valve 22 in a closing direction. As the speed of the turbine increases the arm 21 controlling the servo-motor 27 moves upwardly, gradually and the force of the spring 48 is sufficient to move the tertiary valve 24 in a closing direction, partially cutting off the supply of motive fluid to the nozzle 13 and thus regulate the speed of the turbine.

If, however, under the conditions assumed, the valve 24 should momentarily stick in an open position, and the speed of the turbine continues to increase, the arm 21 continues to move upwardly until the valve rod 51 disengages from the valve stem 50 allowing fluid under pressure to pass beneath the piston 31 so that a heavy force is brought into play for moving the tertiary valve in a closing direction. Under a load sufficiently heavy as to require that the tertiary valve be partly open, the fluid pressure beneath the piston 31 forces it upwardly until the valve rod 51 again engages with the valve stem 50 and actuates the valve 46 so as to cut off the supply of fluid pressure from beneath the piston.

From the foregoing, it is apparent that we have devised an improved control mechanism for elastic fluid motors having a plurality of admission valves which is effective to open the valves in a predetermined sequence and close them in the inverse sequence, and that in this apparatus we have provided a mechanism which employs a positive relatively heavy force for closing the valves and holding them on their seats, which force may be readily released and the valve moved in an opening direction with a relatively small force, and that the sticking of valves in either an open or a closed position is prevented.

While we have shown our invention in but one form, it will be obvious to those skilled in the art that it is not so limited, but is susceptible of various other changes and modifications, without departing from the spirit thereof, and we desire, therefore, that only such limitations shall be placed thereupon as are imposed by the prior art or as are specifically set forth in the appended claims.

What we claim is:

1. In a governing device for elastic fluid motors having a primary and one or more other valves for the admission of elastic fluid thereto, the combination of speed-responsive means for closing the primary valve and for directly operating all of the valves in opening direction, a separate servo-motor controlled by said speed responsive means for closing each of the valves other than the primary valve and means for fixing the sequence in which the valves open and close.

2. In a governing device for elastic fluid motors having a primary and one or more other valves for the admission of elastic fluid thereto, the combination of a speed-responsive device, a fluid relay actuated by said speed-responsive device for closing the primary valve and opening all of the valves, a separate servo-motor for closing each of the valves other than the primary valve, each of said servo-motors having adjustable means for fixing the time of movement of the valve which it actuates in relation to the movement of the primary valve.

3. In a governing device for elastic fluid motors having a primary and one or more other valves for the admission of fluid thereto, the combination of a speed-responsive device, a fluid relay actuated by said speed-responsive device for closing the primary valve and opening all of the valves in sequence, a separate servo-motor for closing each of the valves other than the primary valve in the inverse sequence to the opening thereof, each of said servo-motors having adjustable means for fixing the time of movement of the valve which it actuates in relation to the movement of the primary valve.

4. In an elastic-fluid turbine having a pressure chest for supplying elastic fluid to a primary and one or more other nozzles with corresponding valves controlling the admission of elastic fluid to the nozzles, the combination of a speed-responsive means for directly operating the primary and other valves in opening direction, separate means controlled by said speed-responsive means for closing valves other than the primary valve and means for establishing the sequence in which the valves are opened and closed.

5. In an elastic-fluid turbine having a pressure chest for supplying elastic fluid to a primary and one or more other nozzles with corresponding valves controlling the admission of elastic fluid to the nozzles, the combination of a speed-responsive means, a fluid relay actuated by said speed-responsive means for opening the primary and other valves, separate means for closing valves other than the primary valve and means for establishing the sequence in which the valves are opened and closed.

6. In an elastic-fluid turbine having a pressure chest for supplying elastic fluid to a primary and one or more other nozzles with corresponding valves controlling the admission of elastic fluid to the nozzles, the combination of a speed-responsive means, a fluid relay actuated by said speed-responsive means for opening the primary and other valves and for closing the primary valve, separate means for closing valves other than the primary valve and means for establishing the sequence in which the valves are opened and closed.

7. In an elastic-fluid turbine having a pressure chest for supplying elastic fluid to a primary and one or more other nozzles with corresponding valves controlling the admission of elastic fluid to the nozzles, the combination of a speed-responsive means, a fluid relay actuated by said speed-responsive means for opening the primary and other valves and for closing the primary valve, separate relays for closing each of the valves other than the primary valve and means for establishing the sequence in which the valves are opened and closed.

8. In an elastic-fluid turbine having a pressure chest supplying elastic fluid to a primary and one or more other nozzles with corresponding valves controlling the admission of elastic fluid to the nozzles, the combination of a speed-responsive means, a fluid relay actuated by said speed-responsive means for opening the primary and other valves and for closing the primary valve, servo-motors for closing each of the valves other than the primary valve and means for establishing the sequence in which the valves are opened and closed.

9. In a governing device for elastic fluid motors, the combination of a speed-responsive device, an admission valve to be opened and closed and a servo-motor, said servo-motor being effective to close the valve and to hold it on its seat with a relatively large force, said speed-responsive device being effective to readily release the force with which the valve is held on its seat and to open the valve by a relatively small force exerted by the speed responsive device.

10. In an elastic-fluid motor having an admission valve, the combination of a fluid motor for closing the valve and holding it on its seat, a spring for normally biasing the valve toward a closing position and speed-responsive means for controlling the fluid-motor and for directly operating the valve in opening direction, the force required to open the valve being less than the force which closes the valve and holds it on its seat.

11. In a governing means for an elastic-fluid motor, the combination of a speed-responsive device, an admission valve normally biased toward a closing position for supplying elastic fluid to the motor, and a servo-motor controlled by the speed-responsive device, said servo-motor being effective to positively close the admission valve and hold it on its seat, said speed-responsive device being effective to directly operate the admission valve in opening direction when the speed of the motor falls below a predetermined point, the force with which the admission valve is closed and held on its seat being greater than the force required to open the valve.

12. In a governing device for an elastic-fluid motor, the combination of a speed-responsive device, an admission valve normally biased toward a closing position for supplying elastic fluid to the motor, and a servo-motor controlled by the speed-responsive device, said servo-motor being effective to automatically close the admission valve and hold it on its seat when the speed of the motor increases above a predetermined point, said speed-responsive device being effective to directly operate the admission valve in opening direction when the speed of the motor falls below a predetermined point, the force with which the admission valve is closed and held on its seat being greater than the force required to open the valve.

13. In a governing device for elastic-fluid motors, the combination of a speed-responsive means, an admission valve and a servo-motor, said speed-responsive means being effective to directly operate the admission valve in opening direction when the speed of the motor to be governed falls below a predetermined point and said servo-motor being effective to automatically close the admission valve when the speed increases above a predetermined point.

14. In a governing device for elastic-fluid motors, the combination of a speed-responsive means, an admission valve and a servo-motor, said speed-responsive means being effective to directly operate the admission valve in opening direction when the speed of the motor to be governed falls below a predetermined point and said servo-motor being effective to automatically close the admission valve and hold it on its seat when the speed increases above a predetermined point.

15. In a governing mechanism for an elastic-fluid motor, the combination of a speed-responsive device, an admission valve and a servo-motor, said speed-responsive device being effective to directly operate the admission valve in opening direction with a relatively small force when the speed of the motor to be governed falls below a predetermined point, and said servo-motor being effective to automatically close the admission valve and hold it on its seat with a relatively heavy force when the speed increases above a predetermined point.

16. In a valve control mechanism for an elastic-fluid motor, the combination of a valve for controlling the admission of fluid to the motor, speed-responsive means, a servo-motor comprising a cylinder having an inlet for fluid under pressure and an outlet for the exhaust of fluid, a hollow single-acting piston within said cylinder having passages connecting the hollow portion to the two faces thereof and to the inlet for liquid under pressure, a valve within the piston which in one position connects the fluid under pressure with one face of the piston and in another position connects that face of the piston with the exhaust outlet, a spring for moving the valve in one direction, means whereby the valve is moved in the opposite direction by the speed-responsive means and means for connecting the operating piston to the valve for controlling the admission of fluid to the motor whereby the pressure exerted against one face of the operating piston holds the valve on its seat.

17. In a governing device for elastic fluid motors having a primary and one or more other valves for the admission of elastic fluid thereto, the combination of speed-responsive means for closing the primary valve and for directly operating all of the valves in opening direction, and a separate servo-motor controlled by said speed-responsive means for closing each of the valves other than the primary valve.

18. The combination with an elastic fluid motor having a primary valve and a plurality of other valves admitting elastic fluid thereto, of a governing device therefor comprising a speed-responsive device, a fluid-pressure relay controlled by said speed-responsive device and including a piston operating said primary valve, a separate servomotor controlled by said piston for actuating each of said other valves in at least one direction, and adjustable means between said piston and each servo-motor for fixing the time of movement of the valve which the servo-motor operates in relation to movement of said piston.

19. In a governing system for a fluid motor, the combination of a plurality of admission valves, a speed-responsive governor, a separate power actuated relay for operating each of said admission valves in at least one direction and controlled by the speed-responsive governor, and means including adjustable lost motion mechanism interposed between each of the power actuated relays and the governor for varying the time of operation of the relay with respect to the time of operation of the governor.

In testimony whereof, we have hereunto subscribed our names this twenty-seventh day of October 1924.

FRANCIS HODGKINSON.
ROBERT C. ALLEN.